United States Patent [19]
Döbert et al.

[11] Patent Number: 5,824,733
[45] Date of Patent: Oct. 20, 1998

[54] AQUEOUS COATING PRODUCT AND A PROCESS FOR PRODUCING MULTIPLE LAYER PAINT COATINGS WHOSE PERCEIVED COLOR VARIES WITH THE ANGLE FROM WHICH THEY ARE VIEWED

[75] Inventors: Jürgen Döbert, Gevelsberger Str.; Manfred Oppermann, Starenstr.; Michael Prescher, Ilexweg; Günter Richter, Wilhelm-Brockhaus-Weg, all of Germany

[73] Assignee: Wacker-Chemie GmbH, Germany

[21] Appl. No.: 737,282

[22] PCT Filed: Apr. 26, 1995

[86] PCT No.: PCT/EP95/01584

§ 371 Date: Sep. 24, 1996

§ 102(e) Date: Sep. 24, 1996

[87] PCT Pub. No.: WO95/29962

PCT Pub. Date: Nov. 9, 1995

[30] Foreign Application Priority Data

Apr. 30, 1994 [DE] Germany ............. 44 15 265.5

[51] Int. Cl.⁶ ..................................................... C08L 83/00
[52] U.S. Cl. ............................................ 524/506; 524/507
[58] Field of Search ..................... 524/591, 507, 524/506

[56] References Cited

U.S. PATENT DOCUMENTS

| | | |
|---|---|---|
| 4,315,186 | 2/1982 | Hirano et al. . |
| 4,388,453 | 6/1983 | Finkelmann et al. . |
| 4,410,570 | 10/1983 | Kreuzer ........................ 427/374.1 |
| 4,489,135 | 12/1984 | Drexler et al. . |
| 4,780,383 | 10/1988 | Garrett et al. . |
| 4,851,460 | 7/1989 | Stranghöner et al. . |
| 4,914,148 | 4/1990 | Hille et al. . |
| 4,935,461 | 6/1990 | Nakamura ........................ 523/160 |
| 4,948,829 | 8/1990 | Mitsuji et al. . |
| 4,981,885 | 1/1991 | Engel et al. . |
| 5,075,375 | 12/1991 | Hille et al. . |
| 5,098,478 | 3/1992 | Krishnan ........................ 523/160 |
| 5,211,877 | 5/1993 | Andrejewski et al. . |
| 5,342,882 | 8/1994 | Göbel et al. . |
| 5,362,315 | 11/1994 | Müller-Rees et al. . |
| 5,364,557 | 11/1994 | Faris ........................ 252/229.01 |
| 5,412,021 | 5/1995 | Nakanishi ........................ 523/160 |

FOREIGN PATENT DOCUMENTS

| | | |
|---|---|---|
| 2034048 | 7/1991 | Canada . |
| 2040185 | 10/1991 | Canada . |
| 2068167 | 11/1992 | Canada . |
| 2073081 | 1/1993 | Canada . |
| 2073115 | 1/1993 | Canada . |
| 210845 | 2/1994 | Canada . |
| 2114035 | 7/1994 | Canada . |
| A-0 038 127 | 10/1981 | European Pat. Off. . |
| A1-0 066 137 | 12/1982 | European Pat. Off. . |
| 0 089 497 | 9/1983 | European Pat. Off. . |
| 0 226 171 | 6/1987 | European Pat. Off. . |
| 0 228 003 | 7/1987 | European Pat. Off. . |
| 0 238 037 | 9/1987 | European Pat. Off. . |
| A-0 234 362 | 9/1987 | European Pat. Off. . |
| 0 287 144 | 10/1988 | European Pat. Off. . |
| 301 300 | 2/1989 | European Pat. Off. . |
| A1-0 353 797 | 2/1990 | European Pat. Off. . |
| A1-0 354 261 | 2/1990 | European Pat. Off. . |
| 0 357 844 | 3/1990 | European Pat. Off. . |
| A-0 358 205 | 3/1990 | European Pat. Off. . |
| A2-358 208 | 3/1990 | European Pat. Off. . |
| A1-0 399 427 | 11/1990 | European Pat. Off. . |
| 0 422 357 | 4/1991 | European Pat. Off. . |
| 0 424 705 | 5/1991 | European Pat. Off. . |
| 0 512 524 | 11/1992 | European Pat. Off. . |
| OS-29 26 854 | 1/1980 | Germany . |
| 31 10 048 | 9/1982 | Germany . |
| 36 04 757 | 9/1986 | Germany . |
| 36 28 124 | 3/1988 | Germany . |
| 39 15 459 A1 | 11/1989 | Germany . |
| A1-38 32 142 | 4/1990 | Germany . |
| 39 03 804 | 8/1990 | Germany . |
| 40 00 889 | 7/1991 | Germany . |
| 40 01 841 | 7/1991 | Germany . |
| 40 11 633 A1 | 10/1991 | Germany . |
| 41 22 265 | 1/1993 | Germany . |
| 41 22 266 | 1/1993 | Germany . |
| 42 24 617 | 1/1994 | Germany . |
| 42 28 510 | 3/1994 | Germany . |
| 42 40 743 | 6/1994 | Germany . |
| 43 01 991 | 7/1994 | Germany . |
| WO 91/11477 | 8/1991 | WIPO . |

OTHER PUBLICATIONS

De Visser et al., j. Polym. Sci, A1(9), 1893ff (1971) is in English language.

D.J. Broer et al. in 14th Int. Liquid Crystal Conference, Abstracts, vol. II, 921, 1992 is in English language.

CA113(22):201523y.
CA113(14):124523u.
CA112(18):169216s.
CA112(16):149138q.
CA112(4):21552c.
CA111(16):144258y.
CA111(4):24780r.

C.G. Roffey, Photopolymerisation of Surface Coatings (1982), John Wiley & Sons, Chichester, pp. 137–208, "Photopolymerizable film–forming materials" is in English language.

(List continued on next page.)

*Primary Examiner*—Paul R. Michl
*Attorney, Agent, or Firm*—Brooks & Kushman P.C.

[57] ABSTRACT

The proposed aqueous coating product for the production of coatings whose perceived color changes with the angle from which they are viewed contains: one or more water-diluable binders; one or more scale-type pigments, the hue of which depends on the angle from which they are viewed, these pigments consisting of oriented, three-dimensionally cross-linked substances of chiral phase, liquid crystalline structure; optionally one or more cross-linking agents; optionally one or more coloring absorption pigments and/or fillers; and optionally additives usually used in coatings of this type.

12 Claims, No Drawings

OTHER PUBLICATIONS

English Derwent Abstract AN 90–116610 [16] for DE–A1–38 32 142.

English Derwent Abstract AN 89–033224 [05] for EP 301 300.

English Derwent Abstract AN 90–261577 [35] for DE 39 03 804.

English Derwent Abstract AN 89–008850 [02] for EP 297 576.

English Derwent Abstract AN 90–076955 [11] for EP–A–0 358 205.

AQUEOUS COATING PRODUCT AND A PROCESS FOR PRODUCING MULTIPLE LAYER PAINT COATINGS WHOSE PERCEIVED COLOR VARIES WITH THE ANGLE FROM WHICH THEY ARE VIEWED

The invention relates to water-dilutable coating compositions which are suitable for producing coatings having a particularly bright perceived color which depends on the viewing angle. These coating compositions are, in particular, aqueous basecoats.

On environmental grounds, attempts are being made to replace solvent-containing coating compositions by their aqueous counterparts. This replacement is particularly important in the case of effect basecoats, since such systems, owing to their nature, have a particularly high solvent content. Accordingly, aqueous effect basecoats have been developed. They comprise plateletlike special-effect pigments which bring about a so-called brightness flop and/or color flop. On the basis of pure metal flake pigments for producing a brightness flop, for example those of aluminum, a large number of further plateletlike special-effect pigments have been developed which are suitable for use in aqueous effect basecoats. Examples of further plateletlike special-effect pigments are interference pigments, for example metal pigments coated with metal oxide, an example being aluminum coated with titanium dioxide or with mixed oxide, and coated micas, for instance micas coated with titanium dioxide, and graphite special-effect pigments. Using the known interference pigments, only a relatively weak color flop can be obtained.

EP-A-0 357 844 describes water-dilutable coating compositions which comprise a combination of flop effect pigments and encapsulated, thermochromic, liquid-crystal pigments. Coatings produced therewith change their perceived color reversibly in dependence on the temperature.

The earlier, as yet unpublished German Patent Application P 42 40 743.5 describes pigments whose color depends on the viewing angle, which consist of oriented, three-dimensionally crosslinked substances having a liquid-crystalline structure with a chiral phase.

The object of the invention is to provide environmentally friendly coating compositions, especially basecoats, whose solvent content is as low as possible and which permit the production of coatings with novel color effects, in which context their perceived color is to be independent of the temperature.

It has been found that this object can be achieved by the use of plateletlike pigments whose color depends on the viewing angle, which consist of oriented, three-dimensionally crosslinked substances of liquid-crystalline structure with a chiral phase, in aqueous coating compositions.

One subject of the invention is therefore constituted by an aqueous coating composition comprising
  one or more water-dilutable binders,
  one or more plateletlike pigments whose color depends on the viewing angle, which consist of oriented, three-dimensionally crosslinked substances of liquid-crystalline structure with a chiral phase,
  if desired, one or more crosslinking agents,
  if desired, one or more color-imparting absorption pigments and/or fillers, and
  if desired, customary paint additives, which customary paint additives may also include organic solvents.

The pigments whose color depends on the viewing angle, which consist of oriented, three-dimensionally crosslinked substances of liquid-crystalline structure with a chiral phase, are referred to below as LCP pigments (LCP=liquid crystal polymer). The LCP pigments can be obtained by subjecting one or more three-dimensionally crosslinkable liquid-crystalline substances with a chiral phase to orientation, then to three-dimensional crosslinking and subsequently to comminution to the desired particle size. This can be carried out, for example, by first applying the three-dimensionally crosslinkable liquid-crystalline substances with a chiral phase to a substrate in a thin layer, for example by knife coating, crosslinking the layer on this substrate, then detaching it from the substrate and comminuting it to the desired particle fineness. This produces plateletlike pigments which are transparent and colorless per se. By means of appropriate chemical structure-forming measures in relation to the molecular structure, LCP pigments having different effective interference colors can be produced. The plateletlike LCP pigments preferably have a diameter of from 1 to 100 $\mu$m, particularly preferably from 10 to 60 $\mu$m, and a thickness of preferably from 3 to 15 $\mu$m, particularly preferably from 5 to 10 $\mu$m. In accordance with the invention it is possible, for example, to use those LCP pigments as described in the as yet unpublished German Patent Application P 42 40 743.5, to which reference is hereby made. Reference is also made here to the starting substances for the preparation of the LCP pigments, and details on the preparation techniques, which are described therein.

In accordance with German Patent Application P 42 40 743.5, liquid-crystalline substances which are suitable as starting substances for the preparation of the LCP pigments have a twisted structure with a pitch which corresponds to a wavelength of light in the range from UV to IR. This structure is found, for example, in cholesteric liquid crystals. Cholesteric liquid crystals, or, in general, liquid-crystalline substances with a chiral phase, which possess a twisted structure with a desired pitch, can be obtained from nematic, smectic or discotic structures by adding to them a chiral substance. The nature and proportion of the chiral substance determines the pitch of the twisted structure and therefore the wavelength of the reflected light. The twisting of the structure may be either left-handed or right-handed. The starting substances must additionally comprise groups which can be polymerized by addition polymerization, condensation polymerization or polyaddition and of which at least some are in the form of difunctional, trifunctional or more highly functional units. Examples of such groups are methacryloxy and acryloxy groups.

Examples of suitable materials and their preparation are described, for example, in DE-C2-3 604 757, in EP-A2-358 208, in EP-A-0 066 137 (corresponds to U.S. Pat. No. 4 388 453) or in the literature cited in D. J. Broer et al. in 14th Int. Liquid Conf., Abstracts II, 921 (1992).

Three-dimensionally crosslinkable polyorganosiloxanes which are preferably suitable are those according to EP-A-0 358 208.

As starting materials for the preparation of the LCP pigments, however, it is possible in principle to use all cholesteric liquid crystals. It is possible to employ one type of cholesteric liquid crystal, or else a mixture of at least two of these liquid crystals. In addition to these liquid crystals, other dyes and/or pigments can be used as further components in the preparation of the LCP pigments.

In a preferred embodiment, the colorant to be employed is a pigment, for example gas black. The colorant to be employed is, in a further preferred embodiment, soluble in the liquid crystal (mixture) employed. Preference is given to the employment not of a mixture of two or more cholesteric liquid-crystalline substances but of a single, pure, cholesteric liquid-crystalline substance.

The admixing of the pigments and/or dyes to the other starting substances is carried out in a customary manner, for example by incorporation with stirring. The admixing of the dyes and/or pigments brings about, within the LCP pigment, a combination of the angle-dependent color effects of the liquid-crystalline substances with the known color effect(s) of the respective substances admixed. The admixing of these substances does not, however, alter the subsequent process steps for the preparation of the LCP pigments.

A particularly desired LCP pigment color can also be obtained by mixing defined liquid-crystal base mixtures in appropriate proportions. In this case too, there is no change in the subsequent process steps for the preparation of the LCP pigments. The subsequent description of the preparation process, therefore, applies to all variants of the LCP pigments.

Liquid crystals with twisted phases develop their optical properties only when the individual molecules are arranged in layers and are ordered uniformly within a layer. In this context, the molecules change their preferential direction from layer to layer, producing helical structures as a result. In order to achieve this, the molecules are aligned (oriented) by means of known methods, for example by alignment layers or electrical or magnetic fields. Such methods are known, for example, from the following references: CA113 (22), 201523y; CA113 (14), 124523u; CA112 (18), 169216s; CA112 (16), 149138q; CA112 (4), 21552c; CA111 (16), 144258y; CA111 (4), 24780r.

In the course of the preparation of the LCP pigments, the starting substances cited as examples are oriented in a known manner. This can be accomplished, for example, by knife coating onto a metal, plastics or glass substrate. The knife coating of liquid-crystalline polyorganosiloxanes onto a film is known, for example, from EP-A-0 358 208.

The oriented liquid-crystalline substances are crosslinked as is known from the prior art for the respective material. For example, liquid-crystalline polyorganosiloxanes can be crosslinked thermally by the method described in EP-A-0 066 137. The liquid-crystalline polyorganosiloxanes described in EP-A-0 358 208 can be three-dimensionally crosslinked photochemically, for example by irradiation with UV light. An overview of methods for the photochemical crosslinking of oriented starting materials can be found in C. G. Roffey, Photopolymerization of Surface Coatings (1982), John Wiley & Sons, Chichester, pp. 137–208.

The particular perceived color of the coatings produced from the aqueous coating compositions according to the invention is a result of parallel alignment of the plateletlike LCP pigments in the coating film. The regular structure and the uniform molecular arrangement within these liquid-crystalline units gives rise to interference phenomena with the incident light. The perceived color changes depending on the incident angle of the light and, in addition, on the viewing angle. When viewing a three-dimensional article with such a coating, for example, this results in a perceived color which varies over the entire article.

The aqueous coating composition according to the invention may be physically drying or may be crosslinkable with the formation of covalent bonds. The coating compositions which crosslink with the formation of covalent bonds may be autocrosslinking or externally crosslinking systems. The systems may comprise one or two components.

The aqueous coating composition according to the invention comprises water-dilutable binders. To assure their dilutability in water, these binders comprise nonionic and/or ionic groups which impart hydrophilicity.

Examples of suitable nonionically stabilized binders are those binders whose dilutability in water is achieved by the incorporation of polyether segments into the resin molecule. Examples of polyurethane resins or polyurethane acrylate resins stabilized in this way are described in EP-A-0 354 261, EP-A-0 422 357 and EP-A-424 705.

The water-dilutable binders which carry ionic groups may be binders carrying cationic or anionic groups.

Examples of appropriate cationically stabilized binders are described in DE-A-40 11 633. These are completely or partially neutralized, cationic, (meth)acrylic copolymer resins, polyester resins, polyurethane resins and/or polyurethaneurea resins, especially those having a number-average molecular weight (Mn) of from 500 to 500,000, an OH number of from 0 to 450, an amine number of from 20 to 200 and a glass transition temperature of from −50° to +150° C.

Preferred binders are those stabilized by anionic groups. They comprise one or more film-forming resins as are customary in aqueous coating compositions, especially in aqueous basecoats. The film-forming resins can, for example, have a polyester, (meth)acrylic copolymer or, preferably, a polyurethane basis. They may be autocrosslinking, externally crosslinking or physically drying. Examples of appropriate water-dilutable (meth)acrylic copolymers are described in EP-A-0 399 427 and EP-A-0 287 144.

Examples of appropriate water-dilutable polyester resins are described in DE-A-29 26 854, DE-A-38 32 142 and EP-A-0 301 300.

It is also possible to employ mixtures of binders. Particularly suitable binders are those in which (meth)acrylic copolymer and polycondensation resin are present bonded covalently or in the form of interpenetrating resin molecules. Examples of such a combination of (meth)acrylic copolymer and polyester resin which can be used are described in EP-A-0 226 171.

Examples of the anionically stabilized polyurethane resins which are particularly preferred are described in great diversity in the literature. These are aqueous polyurethane dispersions or polyurethane solutions, or binders in which (meth)acrylic copolymer and polyurethane resin are present bonded covalently or in the form of interpenetrating resin molecules. Suitable polyurethane dispersions are stable, aqueous dispersions with a solids content of from 20 to 50% by weight. The weight-average molecular weight (Mw) of the resins can vary within wide limits, for example from 1000 to 500,000.

Further examples of polyurethane dispersions which can be used are those which can be prepared by the chain extension of isocyanate-functional prepolymers with polyamine and/or polyol. They are described, for example, in EP-A-0 089 497, EP-A-0 228 003, DE-A-36 28 124 and EP-A-0 512 524.

Further examples are polyurethane dispersions which can be prepared by the chain extension of isocyanate-functional prepolymers with water, as set out, for example, in DE-A-39 15 459 and DE-A-42 24 617.

It is also possible to use polyurethane dispersions which are prepared by the chain extension of polyisocyanate-reactive polyurethane prepolymers which contain active hydrogen with polyisocyanates, as described, for example, in DE-A-39 03 804 and DE-A-40 01 841.

Further examples of anionically stabilized polyurethane (PU) dispersions which can be used are described in DE-A-42 28 510. These are aqueous polyurethane dispersions which are obtainable by the chain extension of one or more polyurethane resins comprising at least one CH-acidic group in the molecule, by reaction in aqueous or nonaqueous medium with at least one compound which is able to react with at least two CH-acidic groups, and if desired, transfer of a reaction product obtained in a nonaqueous medium to the aqueous phase.

Examples of anionically stabilized, polyurethane-based binders in which (meth)acrylic copolymer and polyurethane resin are present bonded covalently or in the form of interpenetrating resin molecules are described, for example, in EP-A-0 353 797, EP-A-0 297 576, DE-A-41 22 265 and DE-A-41 22 266. These are polymer hybrids prepared by emulsion polymerization of free-radically polymerizable monomers in the presence of anionically stabilized polyurethanes, which may also be functionalized with unsaturated functions.

The coating compositions according to the invention can comprise an aqueous binder, or else two or more aqueous binders can be present in combination. Preferably, the aqueous coating compositions according to the invention comprise aqueous binders based on anionically stabilized polyurethanes. It may be expedient for some, for example up to 50% by weight, of the polyurethane binders to be replaced by resins based on a combination of (meth)acrylic copolymer and polyester resin.

It is also possible for water-dilutable binders based on cellulose to be present.

To prepare the aqueous coating compositions according to the invention it is possible, especially if the binders employed are not autocrosslinking, to use various crosslinking agents, such as, for example, formaldehyde condensation resins, such as phenol-formaldehyde condensation resins and amine-formaldehyde condensation resins, and also free or blocked polyisocyanates. The crosslinking agents can be employed individually or in a mixture. The mixing ratio of crosslinking agent to binder resin is preferably from 10:90 to 40:60, particularly preferably from 20:80 to 30:70, based in each case on the weight of solids.

Amine resins which are suitable crosslinking agents include, for example, alkylated condensation products prepared by reacting aminotriazines and amidotriazines with aldehydes. In accordance with known technical processes, amines or compounds carrying amino groups, such as melamine, guanamine, acetoguanamine, benzoguanamine, dicyandiamide or urea, are subjected to condensation in the presence of alcohols, such as methanol, ethanol, propanol, butanol or hexanol, with aldehydes, especially formaldehyde. Examples of such resins and their preparation are described in Houben-Weyl, Methoden der organischen Chemie, 1963, page 357. These products are available commercially.

It is possible to employ free or blocked polyisocyanates as crosslinking agents. The polyisocyanates are any desired organic diisocyanates and/or polyisocyanates having free isocyanate groups which are attached to aliphatic, cycloaliphatic, araliphatic and/or, less preferably, to aromatic structures and which are liquid at room temperature or are liquefied by adding organic solvents or which, in dissolved form at 23° C., generally have a viscosity of from 0.5 to 2000 mpas, preferably of more than 1 and below 1000 mPas, particularly preferably below 200 mPas. Preferred diisocyanates are those containing from about 3 to about 36 carbon atoms, in particular from about 8 to 15 carbon atoms. Examples of suitable diisocyanates are hexamethylene diisocyanate, tetramethylxylylene diisocyanate, isophorone diisocyanate and dicyclohexylmethane diisocyanate.

Preference is given to the use of polyisocyanates of relatively high isocyanate functionality, for example polyisocyanates prepared by diand/or trimerization of the above-mentioned diisocyanates. Further examples are polyisocyanates which contain biuret groups and are prepared by reacting the abovementioned diisocyanates with water, or polyisocyanates which contain urethane groups and are prepared by reaction with polyols.

In the case of the blocked polyisocyanates, it is possible to use any desired organic polyisocyanates which are suitable for crosslinking, for example those mentioned above, in which the isocyanate groups have been reacted with a compound such that the blocked polyisocyanate formed is resistant to hydroxyl groups and water at room temperature but reacts at elevated temperatures, in general in the range from about 90° to about 250° C.

The blocked polyisocyanates which can be employed as crosslinking agents can be blocked with customary, volatile, monovalent blocking agents as are employed, for example, in paint chemistry. Examples thereof are various alcohols, oximes, phenols, amines, beta-keto compounds, phthalimide, etc. Within a molecule, the polyisocyanates can be blocked with identical or different blocking agents. As crosslinking agents it is also possible to use mixtures of differently blocked polyisocyanates, and also polyisocyanates which are blocked differently within the molecule.

The coating compositions according to the invention can additionally comprise polymer microparticles which are known to the person skilled in the art and are customary in the paints sector. Crosslinked or noncrosslinked microparticles can be employed. Examples of such polymer microparticles are described in EP-A-0 038 127 and EP-A-0 234 362.

The aqueous coating compositions can additionally comprise technical paint additives, for example agents which influence the rheology, such as highly disperse silicic acid, inorganic phyllosilicates or polymeric urea compounds. Examples of other effective thickeners are water-soluble cellulose ethers, such as hydroxyethylcellulose, methylcellulose or carboxymethylcellulose, and synthetic polymers having ionic groups and/or groups with an associated action, such as polyvinyl alcohol, poly(meth)acrylamide, poly (meth)acrylic acid, polyvinyl-pyrrolidone, styrene-maleic anhydride or ethylenemaleic anhydride copolymers and their derivatives, or else hydrophobically modified, ethoxylated polyurethanes or polyacrylates. It is also possible to employ antisettling agents, leveling agents, light stabilizers (for example of the HALS type, of the benzotriazole type, micro-titanium dioxide), antifoams, for example silicone-containing compounds, wetting agents, and adhesion-promoting substances. The term wetting agents also includes known paste resins as are described, for example, in DE-A-40 00 889, which can be employed for improved dispersion and grinding of the pigments. In order to accelerate curing, it is possible if desired to employ catalysts.

Suitable solvents, which may be present in small amounts, are customary technical paint solvents, which can come from the preparation of the binders or are added separately. Examples of such solvents are mono- or polyhydric alcohols, for example propanol, butanol and hexanol; glycol ethers or glycol esters, for example diethylene glycol dialkyl ethers, dipropylene glycol dialkyl ethers, each with $C_1$–$C_6$-alkyl, ethoxypropanol and butylglycol; glycols, for example ethylene glycol, propylene glycol and oligomers thereof, N-methylpyrrolidone, and ketones such as methyl ethyl ketone, acetone and cyclohexanone; aromatic or aliphatic hydrocarbons, for example toluene and xylene, or linear or branched, aliphatic, $C_6$–$C_{12}$ hydrocarbons.

By way of the choice of solvents it is possible to influence the flow and viscosity of the coating composition. By way of the boiling point of the solvent mixture employed, it is possible to influence the evaporation properties.

The coating composition according to the invention comprises at least one LCP pigment and, if desired, one or more inorganic and/or organic color-imparting absorption pigments, if desired one or more fillers, and also, if desired, one or more soluble organic dyes. The coating composition according to the invention comprises no special-effect pigments other than the LCP pigments. The absorption pigments and dyes are preferably dark in nature, since then the special color effect aimed at in accordance with the invention is reinforced to a particular degree. The absorption pigments and dyes can, with regard to their color, be adapted to the effective interference color of the LCP pigment or can differ from it. Preferably, the coating composition according to the invention comprises only one LCP pigment or a mixture of LCP pigments of different effective interference colors and no additional dyes or absorption pigments. By way of the mixing of a plurality of LCP pigments with different effective interference colors, there are no limits on the establishment of all conceivable shades of color.

For incorporation into the coating compositions according to the invention, the pulverulent LCP pigments are first of all processed with preferably water-dilutable organic solvents and additives to form a paste. During the preparation of the paste, it may be expedient to add water-dilutable binders, for example those described above, and/or a customary paste resin. Care must be taken that the plateletlike LCP pigments are not damaged mechanically during the mixing operation.

Examples of color-imparting absorption pigments and/or fillers, which may be organic or inorganic in nature, are titanium dioxide, iron oxide pigments, carbon black, silicon dioxide, barium sulfate, talc, azo pigments, phthalocyanine pigments, quinacridone pigments or pyrrolopyrrole pigments.

The color-imparting absorption pigments and/or fillers are generally dispersed in a portion of the water-dilutable binders. Dispersion can also, preferably, take place in a specific water-dilutable paste resin. One example of a paste resin which is based on an anionically stabilized polyurethane resin and which can be employed preferably in the coating composition according to the invention can be found in DE-A-40 00 889. Dispersion takes place in customary equipment which is known to the person skilled in the art. Subsequently, the finished color pigment dispersion is made up with the remainder of the aqueous binder or of the aqueous paste resin.

If paste resins are present in the coating composition, they add to binder plus any crosslinking agent present.

Where the coating compositions according to the invention are those formulated on the basis of cationically stabilized binders, they contain acids as neutralizing agents. Examples are formic acid, acetic acid and lactic acid.

Where the coating compositions according to the invention are those formulated on the basis of anionically stabilized binders, they contain bases as neutralizing agents. Examples are ammonia or organic amines, such as triethylamine, N-methylmorpholine, or amino alcohols such as dimethylisopropanolamine, dimethylethanolamine and 2-amino-2-methyl-1-propanol.

The coating composition according to the invention can also be prepared in the form of so-called modules, from which the composition is ultimately prepared by mixing directly before use. For example, the LCP pigments can be part of an effect module. In addition, for example, the water-dilutable binders can be part of a binder module and, if desired, of a color module and/or effect module prepared separately therefrom. The crosslinking agents, for example, can be part of a crosslinking module. Other constituents can be present in the form of further separate modules. An example of a modular system of this kind is described in the unpublished German Patent Application P 43 01 991 from the same applicant.

The coating composition according to the invention, for example an aqueous basecoat according to the invention, has a solids content which is, for example, from 10 to 50% by weight, preferably from 15 to 30% by weight. The ratio of total pigment to binder in the aqueous basecoat according to the invention is preferably from 0.03:1 to 1:1, particularly preferably between 0.06:1 and 0.6:1, based in each case on the weight of solids. The LCP pigment/binder ratio in the coating composition according to the invention is preferably from 0.03:1 to 0.5:1, particularly preferably from 0.06:1 to 0.25:1. In the abovementioned ratios, the term binder comprises the binder as such plus any crosslinking agent present plus any paste resin present.

The solvent content of the coating compositions according to the invention is, for example, below 20% by weight, preferably below 15% by weight, particularly preferably below 10% by weight.

The coating compositions according to the invention can be applied by customary methods. They are preferably applied by spraying in a dry-film thickness of, for example, from 15 to 40 $\mu$m. When used as an aqueous basecoat, they are preferably applied by the wet-on-wet technique; in other words, after a flash-off phase, for example at from 20° to 80° C., the aqueous basecoat films can be overcoated with a customary clearcoat in a dry-film thickness of preferably from 30 to 80 $\mu$m and the two coats can be dried together or crosslinked at temperatures of, for example, from 20° to 140° C. The drying conditions of the topcoat layer (basecoat and clearcoat) depend on the clearcoat system used. They may, for example, be from 20° to 150° C. For refinish purposes, temperatures of from 20° to 80° C., for example, are preferred. For production-line finishing, preferred temperatures are generally above 80° C., for example above 100° C. Suitable clearcoats are, in principle, all known clearcoats or coating compositions pigmented with transparent pigments. In this case it is possible to employ either solvent-containing one-component or two-component coating materials, water-dilutable clearcoats or powder clearcoats. It may be expedient to choose a clearcoat thickness which is in the region above 50 $\mu$m, for example by applying two clearcoat films comprising identical or different liquid clearcoats, or a corresponding powder clearcoat film. These multicoat paint systems can be applied to various kinds of substrates. The substrates are generally metallic or plastics substrates, and are frequently precoated; that is to say that plastics substrates, for example, can be provided with a polymer primer, metallic substrates generally possess an electrophoretically applied primer and, if desired, one or more further coats in addition, for example a filler coat. In general, these coats are cured.

As an aqueous basecoat the coating composition according to the invention can, however, also be applied wet-on-wet to noncrosslinked filler coats, as described, for example, in EP-A-0 238 037. In this case, the basecoat is generally stoved together with the filler coat prior to application of a clearcoat topcoat.

The substrates to be coated with the coating composition according to the invention are preferably dark substrates. The term substrate in this context is to be understood not only as a substrate which is provided on its surface with a dark coat of paint but also a substrate, for example a plastics substrate, with inherently dark pigmentation. Examples of dark coats of paint are primers, for example primers applied electrophoretically or by spray painting, polymer primers, filler coats or anti-stonechip coats, or else solid-color basecoats or topcoats. The dark substrates or dark coats of paint are pigmented with dark absorption pigments, special-effect pigments being expressly excluded. Examples of dark substrates are those which are dark blue, dark red, dark green or, preferably, dark gray, with black being particularly preferred. In such cases, the effect aimed at with the coating composition according to the invention stands out with particular distinction. The coating compositions according to the invention can, of course, also be applied to substrates with a relatively light color, but then the special color effect aimed at in accordance with the invention is effective only to a lesser extent.

The coating composition according to the invention permits the production of bright-colored multicoat paint systems with a surprisingly strongly pronounced color flop. The perceived color of the finished substrates changes in dependence on the incident angle of the light and, in addition, on the viewing angle, but is independent of external temperature effects.

The aqueous coating compositions according to the invention meet current environmental requirements, and the multicoat paint systems obtained therewith meet the requirements which are nowadays customary in the finishing of automobiles. The aqueous coating compositions according to the invention are therefore suitable for the OEM finishing and refinishing of vehicles, especially as an aqueous basecoat, but can also be employed in other sectors, for example in the painting of plastics, especially the painting of automotive components.

EXAMPLE 1

Polyorganosiloxanes with Methacryloyl-Functional Side Chains

A solution of 233 g of 4-(prop-2-en-1-oxy)benzoic acid cholesterol ester (obtainable in accordance with DE-A-3 110 048), 178 g of 4-trimethylsiloxyphenyl 4-(prop-2-en-1-oxy) benzoate (obtainable in accordance with EP-A-0 358 208, page 9, Section C) and 56.9 g of tetramethylcyclotetrasiloxane in 400 ml of toluene was boiled under reflux in the presence of 24 mg of dicyclopentadiene platinum dichloride for 1 hour and, following the addition of a solution of 1.2 g of NaCH in 50 ml of ethanol, for a further 7 hours, in order to cleave the silyl ether. The reaction mixture was concentrated to ⅓ of its volume in a rotary evaporator, 7.5 g of p-toluenesulfonic acid and 154 g of methacrylic anhydride were added, and the mixture was heated at 100° C. for 1 hour. After removal of the volatile constituents by distillation, the residue was reprecipitated twice from methylene chloride/ethanol.

The product had the following physical and thermodynamic data:
Glass transition point: 14° C., clearing point: 141° C.

EXAMPLE 2

Preparation of a Polymerizable Monomer 4-ethylphenyl methacryloxybenzoate

A solution of 16.9 g of 4-ethylphenyl 4-trimethylsilyloxybenzoate (prepared according to the instructions in EP-A-0 358 205, page 9, section C) in 15 ml of toluene and 10 ml of ethanol was boiled under reflux for one hour and then freed from volatile constituents by heating at 100° C. for 60 minutes. The 13.3 g of 4-ethylphenyl 4-hydroxybenzoate which remained were dissolved, together with 30 g of methacrylic anhydride and 1.2 g of toluenesulfonic acid, in 15 ml of toluene and the solution was heated at 100° C. for 1 hour. After cooling, the product was precipitated with hexane and recrystallized from ethanol.

EXAMPLE 3

Preparation of a Red Liquid-Crystal Mixture 6 g of the polyorganosiloxane prepared as in Example 1 were dissolved in 50 ml of toluene. 1.5 g of 4-ethylphenyl methacryloxybenzoate (prepared as in Example 2) and 7.5 mg of aluminum cupferron (obtainable under the name Q 1301 from Wako Chemicals GmbH, Neuss) were added to this solution. The toluene was then removed at 70° C. under vacuum in a rotary evaporator.

A viscous LC mass is formed which has the following physical and thermodynamic data:
Glass transition point: −2° C., clearing point: 124° C.

EXAMPLE 4

Preparation of a Blue Liquid-Crystal Mixture 6 g of the polyorganosiloxane were prepared as described in Example 1. This was dissolved in 50 ml of toluene. 2.6 g of methacrylic acid cholesterol ester (prepared as in De Visser et al., J. Polym. Sci., A 1(9), 1893 (1971)) and 9 mg of aluminum cupferron (obtainable under the name Q 1301 from Wako Chemicals GmbH, Neuss) were added to this solution. The toluene was then removed at 70° C. under vacuum in the rotary evaporator.

A viscous LC mass was formed which has the following physical and thermodynamic data: Glass transition point: 4° C., clearing point: 132° C.

EXAMPLE 5

A) Preparation of a Green Liquid-Crystal Mixture 2.8 g of the red color mixture (prepared as described in Example 3), 1.2 g of the blue color mixture (prepared as described in Example 4) and 0.11 g of 2-methyl-1-[4-(methylthio)phenyl]-2-morpholino-1-propanone (obtainable under the name Irgacure 907 from Ciba Marienberg GmbH, Bensheim) were homogeneously mixed with stirring.

A viscous LC mass with a greenish gleam is obtained which has the following thermodynamic data:
Glass transition point: 2° C., clearing point: 128° C.

B) Preparation of an LCP Pigment 4 g of the LC mass prepared as described above under A) were heated to 70° C. and mixed homogeneously, with stirring, with 0.11 g of 2-methyl-1-[4-(methylthio)phenyl]-2-morpholino-1-propanone (obtainable under the name Irgacure 907 from Ciba Marienberg GmbH, Bensheim). The liquid-crystalline material was applied at 80° C. using a doctor blade to a polyethylene terephthalate film (Hoechst AG, Films Division, Wiesbaden) in coat thicknesses of 7 micrometers, the film being advanced under the fixed blade at a rate of about 2 meters per minute. The liquid-crystalline molecules were simultaneously oriented owing to the shear gradient between blade and film. This coat was subsequently irradiated for 5 seconds with a mercury discharge lamp (80 watts/cm) and thus was three-dimensionally crosslinked. The coating film produced on the PET film was tack-free and brittle in the hot and the cold state. It had a reflection wavelength of 530 nanometers (angle of incidence and viewing angle 45°). The mechanical separation of the liquid-crystalline material obtained in this way from the substrate was achieved by guiding the film over a deflection roller with a diameter of 10 cm and, in this way, peeling the crosslinked material from the substrate. The grinding of the crosslinked, substrate-free material was carried out in a universal mill. Grinding of the crosslinked polyorganosiloxanes, which were obtained predominantly in the form of leaflets (size: a few millimeters to centimeters), for five minutes gave a pulverulent fraction. The ground material was then subjected to a sieving process in order to narrow the particle-size distribution.

EXAMPLE 6

Preparation of a Binder Module

The following constituents are mixed together thoroughly with stirring:

26.2 parts of a PU dispersion according to DE-A-4 224 617, preparation example 3, 8.8 parts of hexamethoxymethylmelamine, 5 parts of n-butanol, 3.5 parts of a commercial thickener based on polyacrylic acid, 0.25 part of N,N-dimethylethanolamine, and 56.25 parts of deionized water.

EXAMPLE 7

Preparation of an LCP Effect Module

The following constituents are present in the LCP effect module:

35 parts of the PU dispersion from Example 6, 12 parts of the LCP pigment according to Example 5 B (particle-size fraction: 1–100 $\mu$m), 25 parts of butylglycol, 1.8 parts of the thickener from Example 6, and 0.2 part of N,N-dimethylethanolamine.

The LCP pigments are pasted up with solvents and additives. The binder is then added and the constituents are mixed thoroughly. The mixture is then diluted with 24 parts of deionized water.

EXAMPLE 8

Preparation of an Aqueous LCP Effect Basecoat 80 parts of the binder module from Example 6 and 20 parts of the LCP effect module from Example 7 were mixed uniformly in order to formulate storage-stable aqueous effect basecoats.

EXAMPLE 9

Preparation of a Multicoat Paint System

The aqueous LCP effect basecoat from Example 8 is applied by spraying, in a dry-film thickness of 20 micrometers, to customary, phosphatized metal bodywork panels which have been precoated by cathodic deposition and with a black filler. Following the application, the coating is flashed off at room temperature for 10 minutes and then predried at 80° C. for 10 minutes. A commercial two-component polyurethane clearcoat based on acrylate resin is then applied in a dry-film thickness of 50 micrometers, and the resulting paint system is dried at 100° C. (panel temperature) for 30 minutes.

A multicoat paint system is obtained which has an extremely strongly pronounced color flop whose color changes from green to blue.

We claim:

1. An aqueous coating composition suitable for use as a basecoat in basecoat/clearcoat paint systems, comprising;
   at least one water dilutable binder,
   at least one platelet like pigment whose color depends on the viewing angle consisting of oriented, three-dimensionally crosslinked substances of liquid crystalline structure with a chiral phase, and
   optionally one or more crosslinking agents, color-imparting absorption pigments, fillers or paint additives.

2. The aqueous coating composition as claimed in claim 1 having a solids content of from 10% to 50% by weight, a total pigment to binder ratio of from 0.03:1 to 1:1 based on the weight of the solids and a solvent content below 20% by weight.

3. The aqueous coating compositions as claimed in claim 14 having a ratio of platelet like pigments based on three-dimensionally crosslinked substances of liquid-crystalline structure to binder ratio of from 0.03:1 to 0.5:1, based on the weight of the solids.

4. The aqueous coating composition as claimed in claim 1, wherein the water-dilutable binders are cationically stabilized resins based on (meth)acrylic copolymer resins, polyester resins, polyurethane resins and/or polyurethane-urea resins.

5. The aqueous coating composition as claimed in claim 1 wherein the water-dilutable binders have a number-average molecular weight (Mn) of from 500 to 500,000, a hydroxyl number of from 0 to 450, an amine number of from 20 to 200 and a glass transition temperature of from −50 to +150° C.

6. The aqueous coating composition as claimed in claim 1, wherein the water-dilutable binders are anionically stabilized resins based on (meth)acrylic copolymer resins, polyester resins and/or polyurethane resins.

7. The aqueous coating composition as claimed in claim 2, wherein the water-dilutable resins have a weight-average molecular weight of from 1000 to 500,000.

8. The aqueous coating composition as claimed in claim 1, wherein the crosslinking agents are formaldehyde condensation resins and/or free or blocked polyisocyanates.

9. The aqueous coating composition as claimed in claim 8, wherein the mixing ratio of crosslinking agent to binder resin is from 10:90 to 40:60, based on the weight of solids.

10. A process for the multicoat painting of substrates by applying a basecoat/clearcoat system to an uncoated or precoated substrate, wherein the basecoat is a coating composition as claimed in claim 1 and the basecoat is optionally coated, wet-on-wet with the clearcoat.

11. The process as claimed in claim 10, wherein the basecoat is applied to a dark substrate or to a substrate which is provided with a dark coating film.

12. A process for the multicoat finishing of automobiles or painting of parts thereof comprising the process as claimed in claim 10.

* * * * *

UNITED STATES PATENT AND TRADEMARK OFFICE
CERTIFICATE OF CORRECTION

PATENT NO. : 5,824,733
DATED : October 20, 1998
INVENTOR(S) : JÜRGEN DÖBERT et al.

It is certified that error appears in the above-identified patent and that said Letters Patent is hereby corrected as shown below:

Column 12, Line 27, Claim 3, delete "14" and insert --2--.

Signed and Sealed this

Fourth Day of May, 1999

Q. TODD DICKINSON

Attest:

Attesting Officer

Acting Commissioner of Patents and Trademarks